United States Patent
Sun et al.

(10) Patent No.: US 11,270,169 B2
(45) Date of Patent: Mar. 8, 2022

(54) IMAGE RECOGNITION METHOD, STORAGE MEDIUM AND COMPUTER DEVICE

(71) Applicant: Tencent Technology (Shenzhen) Company Limited, Shenzhen (CN)

(72) Inventors: Xing Sun, Shenzhen (CN); Yi Zhang, Shenzhen (CN); Xinyang Jiang, Shenzhen (CN); Xiaowei Guo, Shenzhen (CN); Xuan Zhou, Shenzhen (CN); Jia Chang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/942,383

(22) Filed: Jul. 29, 2020

(65) Prior Publication Data
US 2020/0356805 A1    Nov. 12, 2020

Related U.S. Application Data

(63) Continuation of application No. PCT/CN2019/083151, filed on Apr. 18, 2019.

(30) Foreign Application Priority Data

May 16, 2018 (CN) .......................... 201810467783.2

(51) Int. Cl.
*G06K 9/62* (2006.01)
*G06K 9/34* (2006.01)
(Continued)

(52) U.S. Cl.
CPC ............. *G06K 9/628* (2013.01); *G06K 9/346* (2013.01); *G06K 9/46* (2013.01); *G06K 9/54* (2013.01);
(Continued)

(58) Field of Classification Search
CPC .................. G06N 3/0454; G06N 3/08; G06T 2207/20081; G06T 2207/20084
See application file for complete search history.

(56) References Cited

U.S. PATENT DOCUMENTS

| 2018/0239987 A1* | 8/2018 | Chen ................... G06K 9/4628 |
| 2020/0085290 A1* | 3/2020 | Wang ................... G06T 7/0014 |

FOREIGN PATENT DOCUMENTS

| CN | 106097335 A | 11/2016 |
| CN | 107045720 A | 8/2017 |

(Continued)

OTHER PUBLICATIONS

Tencent Technology, WO, PCT/CN2019/083151, Jun. 28, 2019, 5 pgs.

(Continued)

*Primary Examiner* — Ross Varndell
(74) *Attorney, Agent, or Firm* — Morgan, Lewis & Bockius LLP

(57) ABSTRACT

This application provides an image recognition method, a storage medium, and a computer device. The method includes: obtaining a to-be-recognized image; preprocessing the to-be-recognized image, to obtain a preprocessed image; obtaining, through a first submodel in a machine learning model, a first image feature corresponding to the to-be-recognized image, and obtaining, through a second submodel in the machine learning model, a second image feature corresponding to the preprocessed image; and determining, according to the first image feature and the second image feature, a first probability that the to-be-recognized image belongs to a classification category corresponding to the machine learning model. It may be seen that, the solutions provided by this application can improve recognition efficiency and accuracy.

20 Claims, 8 Drawing Sheets

(51) Int. Cl.
*G06K 9/46* (2006.01)
*G06K 9/54* (2006.01)
*G06N 3/04* (2006.01)
*G06N 3/08* (2006.01)
*G06T 3/40* (2006.01)
*G06T 5/00* (2006.01)

(52) U.S. Cl.
CPC ........... *G06K 9/629* (2013.01); *G06K 9/6256* (2013.01); *G06N 3/04* (2013.01); *G06N 3/08* (2013.01); *G06T 3/40* (2013.01); *G06T 5/007* (2013.01); *G06K 2209/05* (2013.01); *G06T 2207/20081* (2013.01); *G06T 2207/20084* (2013.01); *G06T 2207/20132* (2013.01); *G06T 2207/30004* (2013.01)

(56) References Cited

FOREIGN PATENT DOCUMENTS

| CN | 107220598 A | 9/2017 |
|---|---|---|
| CN | 107423571 A | 12/2017 |
| CN | 108665457 A | 10/2018 |
| CN | 108781831 A | 11/2018 |
| EP | 3287943 A1 | 2/2018 |
| JP | 2008009728 A | 1/2008 |
| JP | 2017045341 A | 3/2017 |
| JP | 6231258 B2 | 11/2017 |
| JP | 2018032391 A | 3/2018 |

OTHER PUBLICATIONS

Tencent Technology, IPRP, PCT/CN2019/083151, Nov. 17, 2020, 6 pgs.
Tencent Technology, ISR, PCT/CN2019/083151, Jun. 28, 2019, 2 pgs.
Extended European Search Report, EP19803023.1, dated Aug. 19, 2021, 9 pgs.
Kazuyoshi Yamamoto et al., "Speech Balloon and Speaker Association by Data Driven Approach", Department of Information and Communication Engineering, University of Tokyo, Technical Report of the Institute of Image Information and Television Engineers, vol. 42, No. 4, Feb. 8, 2018, 6 pgs.

* cited by examiner

IMAGE RECOGNITION METHOD, STORAGE MEDIUM AND COMPUTER DEVICE

CROSS REFERENCE TO RELATED APPLICATIONS

This application is a continuation application of PCT Patent Application No. PCT/CN2019/083151, entitled "IMAGE PROCESSING METHOD AND DEVICE, COMPUTER APPARATUS, AND STORAGE MEDIUM" filed on Apr. 18, 2019, which claims priority to Chinese Patent Application No. 201810467783.2, entitled "IMAGE RECOGNITION METHOD AND APPARATUS, STORAGE MEDIUM, AND COMPUTER DEVICE" filed on May 16, 2018, all of which are incorporated by reference in their entirety.

FIELD OF THE TECHNOLOGY

This application relates to the field of computer technologies, and in particular, to an image recognition method, a storage medium, and a computer device.

BACKGROUND OF THE DISCLOSURE

As is well known, an image may be classified by recognizing information carried in the image, that is, a classification category to which the image belongs is determined among several classification categories. For example, a fundus image may be used for reflecting the illness state of diabetic retinopathy. Accordingly, for any fundus image, a classification category to which the fundus image belongs may be determined among the five classification categories: normal, mild NPDR, moderate NPDR, severe NPDR, and PDR.

In the related art, an image is mainly determined manually, to determine the classification category to which the image belongs. For example, a doctor observes a fundus image through eyes, and determines, according to the experience, which of normal, mild NPDR, moderate NPDR, severe NPDR, and PDR the fundus image belongs to.

SUMMARY

Based on this, an image recognition method, a storage medium and a computer device are provided, to resolve the technical problem of low recognition efficiency and accuracy in the related art.

An image recognition method is performed at a computer device, the method including:
  obtaining, by the computer device, a to-be-recognized image;
  preprocessing, by the computer device, the to-be-recognized image, to obtain a preprocessed image;
  obtaining, by the computer device through a first submodel in a machine learning model, a first image feature corresponding to the to-be-recognized image, and obtaining, through a second submodel in the machine learning model, a second image feature corresponding to the preprocessed image; and
  determining, by the computer device according to the first image feature and the second image feature, a first probability that the to-be-recognized image belongs to a classification category corresponding to the machine learning model.

A non-transitory computer-readable storage medium is provided, storing a plurality of computer programs, the computer programs, when executed by a processor of a computer device, causing the computer device to perform the aforementioned image recognition method.

A computer device is provided, including a memory and a processor, the memory storing a plurality of computer programs, the computer programs, when executed by the processor, causing the processor to perform the aforementioned image recognition method.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Terms such as "first" and "second" used in this application are used for distinguishing similar objects from names. However, these objects are not limited by these terms. It is to be understood that these terms may be exchanged in a proper case without departing from the scope of this application. For example, a "first fully connected layer" may be described as a "second fully connected layer", and similarly, a "second fully connected layer" may be described as a "first fully connected layer".

It may be understood that the terms "include", "contain", "have", and any variant thereof are intended to cover non-exclusive inclusion. For example, a process, method, system, product, or device that includes a list of steps or units is not necessarily limited to those expressly listed steps or units, but may include other steps or units not expressly listed or inherent to such a process, method, system, product, or device. In addition, the term "and/or" includes any and all combinations of one or more related listed items.

Figure 1:
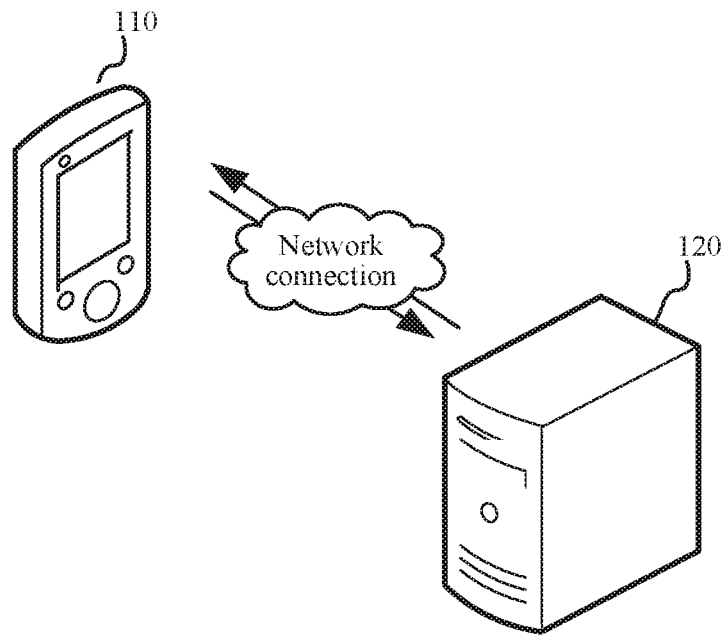
FIG. 1 is a diagram of an application environment of an image recognition method according to an embodiment.

An image recognition method provided in the embodiments of this application may be applied to an application environment shown in FIG. 1. The application environment involves a terminal 110 and a server 120. The terminal 110 and the server 120 are connected through a network. Specifically, the terminal 110 may obtain a to-be-recognized image, and transmit the to-be-recognized image to the server 120. After obtaining the to-be-recognized image, the server 120 preprocesses the to-be-recognized image, inputs the to-be-recognized image and the preprocessed to-be-recognized image into a machine learning model, and then outputs, through the machine learning model, a probability that the to-be-recognized image belongs to a classification category corresponding to the machine learning model.

It may be understood that, in other embodiments, after the terminal 110 obtains a to-be-recognized image, the terminal 110 may also directly preprocesses the to-be-recognized image, inputs the to-be-recognized image and the preprocessed to-be-recognized image to a machine learning model, and then outputs, through the machine learning model, a probability that the to-be-recognized image belongs to a classification category corresponding to the machine learning model. In addition, the machine learning model may be obtained through training by the server 120, or may be obtained through training by the terminal 110.

The terminal 110 may be a desktop terminal or a mobile terminal, and the mobile terminal may include at least one of a mobile phone, a tablet computer, a notebook computer, a personal digital assistant, a wearable device, and a medical imaging device. The server 120 may be implemented by using an independent physical server or a server cluster formed by a plurality of physical servers.

Figure 2:
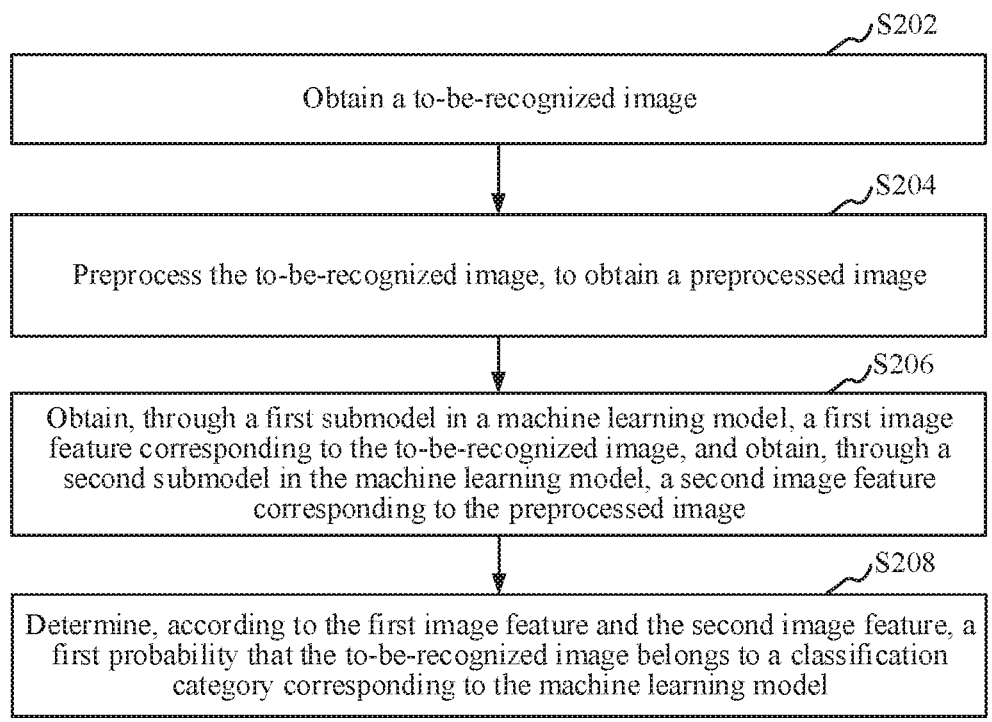
FIG. 2 is a schematic flowchart of an image recognition method according to an embodiment.

In some embodiments, as shown in FIG. 2, an image recognition method is provided. An example in which the method is applied to a computer device (such as the terminal 110 or the server 120 shown in FIG. 1) is used for description. The method may include the following steps S202 to S208.

S202. The computer device obtains a to-be-recognized image.

The to-be-recognized image is an image on which image recognition is to be performed. The image recognition is classifying an image into one or more of several candidate classification categories, that is, determining a classification category to which the image belongs. During actual application, a candidate classification category may be preset according to an actual application requirement. Moreover, the to-be-recognized image is an unprocessed raw image. It may be understood that, the to-be-recognized image may involve various types of images, for example, a character image, an animal image, and a landscape image.

For example, the computer device may obtain an image transmitted by another computer device, and use the image as the to-be-recognized image. For example, the server 120 in FIG. 1 obtains an image transmitted by the terminal 110, and uses the image as the to-be-recognized image. The computer device may alternatively obtain an image generated locally, and use the image as the to-be-recognized image. The computer device may alternatively crawl an image from the Internet, and use the image as the to-be-recognized image.

In some embodiments, the to-be-recognized image may include a medical image. The medical image refers to an internal tissue image that is obtained from an organism or a part of an organism and that is obtained to perform medical treatment or medical research, for example, an internal tissue image obtained in a non-invasive manner. For example, the medical image may include a fundus image. A fundus is a part on which blood vessels can be directly observed on a living organism, and the fundus image may be obtained through a fundus photographing apparatus (such as a fundus camera). The fundus image may be used for reflecting illness states of diseases such as diabetic retinopathy, hypertension, glaucoma, and arteriosclerosis. The medical image may also include a pulmonary lesion region image, for example, a computed tomography (CT) image obtained by performing CT on a pulmonary lesion region, or a magnetic resonance (MR) image obtained through MR imaging. The pulmonary lesion region image may be used for reflecting illness states of diseases such as the lung cancer.

In some embodiments, the to-be-recognized image may be an image file having a visual form, for example, an image file in a JPEG format. The to-be-recognized image may alternatively be image data not having a visual form, for example, a set of pixel values of pixels represented by values.

S204. The computer device preprocesses the to-be-recognized image, to obtain a preprocessed image.

The preprocessed image is a preprocessed to-be-recognized image, that is, an image obtained after the to-be-recognized image is preprocessed. The image is preprocessed to highlight a target detail object in the image. Based on this, compared with a raw to-be-recognized image, the preprocessed to-be-recognized image can display the target detail object in the image more prominently, that is, can highlight details in the to-be-recognized image.

It may be understood that, the target detail object may be determined based on an actual application requirement, and correspondingly, when the to-be-recognized image is preprocessed, a specific preprocessing manner may be determined according to the target detail object that needs to be highlighted in the to-be-recognized image. Using the fundus image as an example, to improve the accuracy for determining the illness state of a corresponding disease, a blood vessel part and a microaneurysm part in the fundus image may be used as target detail objects, that is, the fundus image is preprocessed, to highlight the blood vessels and the microaneurysms in the fundus image.

S206. The computer device obtains, through a first submodel in a machine learning model, a first image feature corresponding to the to-be-recognized image, and obtains, through a second submodel in the machine learning model, a second image feature corresponding to the preprocessed image.

A full name of machine learning is referred to as ML for short. The machine learning model may learn through a sample, and therefore has a specific capability. The machine learning model in this embodiment is a pre-trained model having an image classification capability.

Further subdivided, machine learning may include deep learning (DL for short). In this embodiment, a deep learning manner may be used, thereby omitting a step of manually defining an input feature of a model. In this case, the limitation that the conventional machine learning needs manual participation is broken, and information in input images (the to-be-recognized image and the preprocessed image) of the model is fully mined, so that the accuracy and the stability of the image classification are improved. In addition, during deep learning, a quantity of samples may also be increased, to further improve the accuracy of an output result of the model.

The machine learning model may use a neural network model, for example, a convolutional neural network (CNN) model. Correspondingly, during deep learning, the machine learning model may be a deep learning model.

In some embodiments, the computer device may preset a model structure of the machine learning model, to obtain an initial machine learning model, and then obtain a model parameter of the machine learning model through training by using sample images belonging to classification categories. Accordingly, when image recognition needs to be performed on the to-be-recognized image, the computer device may obtain the pre-trained model parameter, and then import the model parameter to the initial machine learning model, to obtain the machine learning model.

In this embodiment, the machine learning model includes a first submodel and a second submodel. The first submodel may be used for obtaining the first image feature corresponding to the to-be-recognized image, and the second submodel may be used for obtaining the second image feature corresponding to the preprocessed image. Therefore, it may be seen that, in the machine learning model, the two submodels independent of each other may obtain the first image feature and the second image feature respectively.

In addition, in other embodiments, the machine learning model may include more than two submodels. For example, in addition to the first submodel and the second submodel, the machine learning model may further include a third submodel and a fourth submodel. Different submodels may be used for obtaining image features corresponding to to-be-recognized images of different versions. The to-be-recognized images of different versions may include: a to-be-recognized image of a raw version (an unprocessed to-be-recognized image) and a to-be-recognized image of a preprocessed version (a preprocessed to-be-recognized image). Moreover, different preprocessing manners may correspond to to-be-recognized images of different preprocessing versions.

The image feature may be used for reflecting a characteristic of the image. Image classification may be performed on the image according to the characteristic of the image, that is, the image feature of image may be extracted, and image classification is performed on the image according to the image feature. In this process, the image feature is the basis for performing image classification. In this embodiment, the first image feature is an image feature corresponding to the to-be-recognized image, and the second image feature is an image feature corresponding to the preprocessed image.

Specifically, both the first image feature and the second image feature may be high-dimensional features obtained through the machine learning model. In some embodiments, for data structures, both the first image feature and the second image feature may be one-dimensional vectors, for example, an array including 1024 floating-point numbers.

In this embodiment, when image recognition is performed on any to-be-recognized image, both the to-be-recognized image and a preprocessed image that is obtained after the to-be-recognized image is preprocessed may be inputted into the machine learning model. Then, the first submodel in the machine learning model performs feature extraction on the to-be-recognized image, to obtain the first image feature corresponding to the to-be-recognized image, and the second submodel in the machine learning model performs feature extraction on the preprocessed image, to obtain the second image feature corresponding to the preprocessed image. Then, subsequent processing is performed according to the first image feature and the second image feature.

Specifically, the machine learning model may include two input channels. Accordingly, the to-be-recognized image may be inputted into the first submodel of the machine learning model through one input channel in the machine learning model, and the preprocessed image may be inputted into the second submodel of the machine learning model through the other input channel.

S208. The computer device determines, according to the first image feature and the second image feature, a first probability that the to-be-recognized image belongs to a classification category corresponding to the machine learning model.

It may be understood that, the image may be used for reflecting an attribute of a related object. For example, a character image may reflect the gender of the character in the image (briefly referred to as example E-1 below), and in another example, a fundus image may reflect the property and the severity of diabetic retinopathy (briefly referred to as example E-2 below). Based on this, the classification categories are several classification categories related to the attribute of the object reflected by the image. For the example E-1, two classification categories: male and female, may be set, and for the example E-2, five classification categories: normal, mild NPDR, moderate NPDR, severe NPDR, and PDR, may be set.

In this embodiment, the first image feature and the second image feature jointly reflect the classification category, to which the corresponding to-be-recognized image belongs, corresponding to the machine learning model. The classification of the to-be-recognized image may be two-class classification, or may be multi-class classification. The two-class classification of the to-be-recognized image is that for the to-be-recognized image, a total quantity of candidate classification categories is equal to 2, such as the foregoing example E-1. The multi-class classification of the to-be-recognized image is that for the to-be-recognized image, a total quantity of candidate classification categories is greater than 2, for example, the foregoing example E-2 is five-classification of the to-be-recognized image.

In this embodiment, first probabilities that the to-be-recognized image belongs to the classification categories respectively are determined according to the first image feature and the second image feature. For example, if the classification categories are respectively category A, category B, and category C, a first probability that the to-be-recognized image belongs to category A, a first probability that the to-be-recognized image belongs to category B, and a first probability that the to-be-recognized image belongs to category C are determined according to the first image feature and the second image feature.

The first probability may be used for reflecting the possibility that the to-be-recognized image belongs to the corresponding classification category. For example, the first probability that the to-be-recognized image belongs to category A is used for reflecting the possibility that the to-be-recognized image belongs to category A. Specifically, if the first probability that the to-be-recognized image belongs to a classification category is higher, it may indicate that the possibility that the to-be-recognized image belongs to the classification category is higher. On the contrary, if the first probability that the to-be-recognized image belongs to a classification category is lower, it may indicate that the possibility that to-be-recognized image belongs to the classification category is lower. Based on this, the classification category to which the to-be-recognized image belongs may be further determined according to the first probabilities that the to-be-recognized image belongs to the classification categories respectively.

During actual application, the attribute of the object that can be reflected by the to-be-recognized image may be further predicted according to the first probabilities that the to-be-recognized image belongs to the classification categories respectively. Using the to-be-recognized image being a fundus image as an example, according to first probabilities that the to-be-recognized fundus image belongs to normal, mild NPDR, moderate NPDR, severe NPDR, and PDR respectively, the illness state of diabetic retinopathy of the owner of the fundus image may be predicted.

In the foregoing image recognition method, after a to-be-recognized image is obtained, the to-be-recognized image is preprocessed, a first image feature corresponding to the to-be-recognized image and a second image feature corresponding to the preprocessed to-be-recognized image are then obtained through a first submodel and a second submodel in a machine learning model respectively, and a probability that the to-be-recognized image belongs to a classification category corresponding to the machine learning model is further determined according to the first image feature and the second image feature jointly. On one hand, the to-be-recognized image is classified automatically through the machine learning model, which is more accurate than manual determining; on the other hand, the preprocessed to-be-recognized image can highlight details in the image, both basic information in a raw to-be-recognized image and detail information highlighted by the preprocessed to-be-recognized image are used with reference to the first image feature and the second image feature. It may be seen that, the information is fully used based on the to-be-recognized image (that is, the information in the to-be-recognized image is fully mined), thereby further improving the recognition accuracy.

In some embodiments, the step of determining, according to the first image feature and the second image feature, a first probability that the to-be-recognized image belongs to a classification category corresponding to the machine learning model, that is, step S208, may include the following steps: inputting the first image feature and the second image feature into an output layer of the machine learning model; and determining, through the output layer of the machine learning model and according to the first image feature and the second image feature, the first probability that the to-be-recognized image belongs to the classification category corresponding to the machine learning model.

In this embodiment, in addition to the first submodel and the second submodel, the machine learning model further includes an output layer. The output layer of the machine learning model is used for determining, according to the first image feature and the second image feature, the first probability that the to-be-recognized image belongs to the classification category corresponding to the machine learning model, and outputting the first probability.

In some embodiments, the output layer may be a normalized index (softmax) layer. The softmax layer has a capability of obtaining a final classification result of image classification. Specifically, the softmax layer may use the first image feature and the second image feature as inputs, and perform matrix multiplication processing, vector addition processing, and normalized processing sequentially according to the first image feature and the second image feature, to obtain a final classification result of the to-be-recognized image, that is, the first probability that the to-be-recognized image belongs to the classification category corresponding to the machine learning model.

In this embodiment, after the first image feature corresponding to the to-be-recognized image and the second image feature corresponding to the preprocessed image are obtained through the machine learning model, the task of determining, according to the first image feature and the second image feature, the first probability that the to-be-recognized image belongs to the classification category corresponding to the machine learning model continues to be completed through the machine learning model. That is, a user may directly input both the to-be-recognized image and the preprocessed image into the machine learning model, and then the machine learning model may automatically complete the tasks, to further output the first probability that the to-be-recognized image belongs to the classification category corresponding to the machine learning model. In the image recognition process, input features of the machine learning model do not need to be manually defined, thereby implementing end-to-end learning, and simplifying the workflow.

Figure 3:
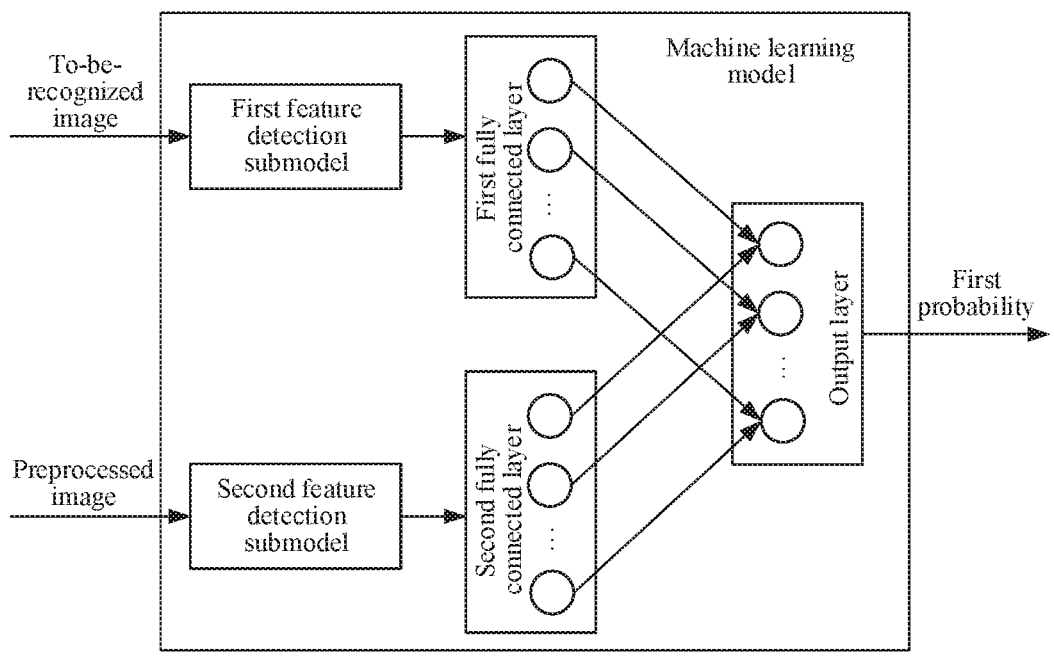
FIG. 3 is a schematic structural diagram of a machine learning model according to an embodiment.

In some embodiment, as shown in FIG. 3, the first submodel includes a first feature detection submodel, the second submodel includes a second feature detection submodel, and the machine learning model further includes: a first fully connected layer connected to the first feature detection submodel and a second fully connected layer connected to the second feature detection submodel, both the first fully connected layer and the second fully connected layer being connected to the output layer. In this case, the step of obtaining a first image feature corresponding to the to-be-recognized image may be implemented through the first feature detection submodel and the first fully connected layer, and the step of obtaining a second image feature corresponding to the preprocessed image may be implemented through the second feature detection submodel and the second fully connected layer.

The feature detection submodels are used for performing image feature extraction on an input image thereof, to obtain an intermediate image feature corresponding to the input image. The intermediate image feature obtained by the feature detection submodel may be determined according to a model parameter of the feature detection submodel. Specifically, the first feature detection submodel is used for performing image feature extraction on the to-be-recognized image, to obtain an intermediate image feature corresponding to the to-be-recognized image. Similarly, the second feature detection submodel is used for performing image feature extraction on the preprocessed image, to obtain an intermediate image feature corresponding to the preprocessed image.

In some embodiments, the first feature detection submodel and the second feature detection submodel may maintain consistent model structures, and may only have different model parameters. Moreover, the model structures of the two may both be obtained through adjustment based on any suitable CNN model. For example, the model structures of them may both be the structure remained after the output layer at the end of an inceptionV3 model is removed. In addition, in addition to the inceptionV3 model, other CNN models may also be adjusted, to obtain the model structures of the first feature detection submodel and the second feature detection submodel. The other CNN models include a RestNet model (or ResNet model), a visual geometry group (VGG) model, a DenseNet model, and the like. In other embodiments, based on an actual application requirement, the first feature detection submodel and the second feature detection submodel may also have different model structures.

The fully connected layer may be used for performing matrix multiplication processing on an input feature and a model parameter that corresponds to the fully connected layer, to obtain a corresponding target image feature. Specifically, the first fully connected layer is connected to the first feature detection submodel. It may be understood that, an output of the first feature detection submodel is an input of the first fully connected layer. In this case, the first fully connected layer may be used for performing matrix multiplication processing on an intermediate image feature outputted by the first feature detection submodel and a model parameter corresponding to the first fully connected layer, to obtain the first image feature corresponding to the to-be-recognized image. Similarly, the second fully connected layer is connected to the second feature detection submodel. An output of the second feature detection submodel is an input of the second fully connected layer. In this case, the second fully connected layer may be used for performing matrix multiplication processing on an intermediate image feature outputted by the second feature detection submodel and a model parameter corresponding to the second fully connected layer, to obtain the second image feature corresponding to the preprocessed image.

Moreover, in the machine learning model, both the first fully connected layer and the second fully connected layer are further connected to the output layer. It may be understood that, both the output of the first fully connected layer and the output of the second fully connected layer are inputs of the output layer. In this case, the output layer may be used for determining, according to the first image feature output by the first fully connected layer, and the second image feature outputted by the second fully connected layer jointly, the first probability that the to-be-recognized image belongs to the classification category corresponding to the machine learning model, and outputting the determined probability.

In this embodiment, after obtaining the to-be-recognized image and the preprocessed image, the computer device inputs the to-be-recognized image into the first feature detection submodel of the machine learning model, and inputs the preprocessed image into the second feature detection submodel of the machine learning model. Then, in the machine learning model, on one hand, the first feature detection submodel performs image feature extraction on the to-be-recognized image, and outputs the extracted intermediate image feature to the first fully connected layer, and then, the first fully connected layer obtains, according to the intermediate image feature, the first image feature corresponding to the to-be-recognized image, and outputs the first image feature to the output layer. On the other hand, the second feature detection submodel performs image feature extraction on the preprocessed image, and outputs the extracted intermediate image feature to the second fully connected layer, and then, the second fully connected layer obtains, according to the intermediate image feature, the second image feature corresponding to the preprocessed image, and outputs the second image feature to the output layer. Then, the output layer determines, according to the received first image feature and second image feature, the first probability that the to-be-recognized image belongs to the classification category corresponding to the machine learning model, and outputs the first probability.

In addition, as described above, the machine learning model may include two input channels. In this case, the to-be-recognized image may be inputted into the first feature detection submodel of the machine learning model through one input channel, and the preprocessed image may be inputted into the second feature detection submodel of the machine learning model through the other input channel.

In some embodiments, the step of determining, according to the first image feature and the second image feature, a first probability that the to-be-recognized image belongs to a classification category corresponding to the machine learning model, that is, step S208, may include the following steps: obtaining, through the machine learning model and according to the first image feature, a second probability that the to-be-recognized image belongs to the classification category corresponding to the machine learning model; obtaining, through the machine learning model and according to the second image feature, a third probability that the preprocessed image belongs to the classification category corresponding to the machine learning model; and performing an operation according to the second probability and the third probability, and determining the first probability that the to-be-recognized image belongs to the classification category corresponding to the machine learning model.

The second probability may be used for preliminarily reflecting the possibility that the to-be-recognized image belongs to the corresponding classification category. The third probability may be used for reflecting the possibility that the preprocessed image belongs to the corresponding classification category.

In this embodiment, after the first image feature corresponding to the to-be-recognized image and the second image feature corresponding to the preprocessed image are obtained through the machine learning model, the second probability that the to-be-recognized image belongs to the classification category corresponding to the machine learning model, and the third probability that the preprocessed image belongs to the classification category corresponding to the machine learning model may continue to be obtained through the machine learning model. At this point, the machine learning model completes the work tasks thereof. Subsequently, other functional modules, of a non-machine learning model, running on the computer device may perform an operation according to the second probability and the third probability, to obtain the first probability that the to-be-recognized image belongs to the classification category corresponding to the machine learning model. Alternatively, after the second probability and the third probability are obtained, the task of performing an operation according to the second probability and the third probability may be completed manually or by other computer devices. It may be understood that, the first probability is used for finally reflecting the possibility that the to-be-recognized image belongs to the corresponding classification category.

In this embodiment, second probabilities that the to-be-recognized image belongs to classification categories respectively are obtained according to the first image feature. For example, if the classification categories are respectively category A, category B, and category C, a second probability that the to-be-recognized image belongs to category A, a second probability that the to-be-recognized image belongs to category B, and a second probability that the to-be-recognized image belongs to category C are determined according to the first image feature. Similarly, third probabilities that the to-be-recognized image belongs to classification categories respectively are obtained according to the second image feature. For example, if the classification categories include category A, category B, and category C, a third probability that the preprocessed image belongs to category A, a third probability that the preprocessed image belongs to category B, and a third probability that the preprocessed image belongs to category C are determined according to the second image feature.

In this embodiment, the operation may include an average operation. In some embodiments, the average operation may be specifically a weighted average operation. For example, a weighted average operation is performed according to the second probability that the to-be-recognized image belongs to a category A, a weight value corresponding to the second probability, the third probability that the preprocessed image belongs to the category A, and a weight value corresponding to the third probability, to obtain the first probability that the to-be-recognized image belongs to the category A.

Figure 4:
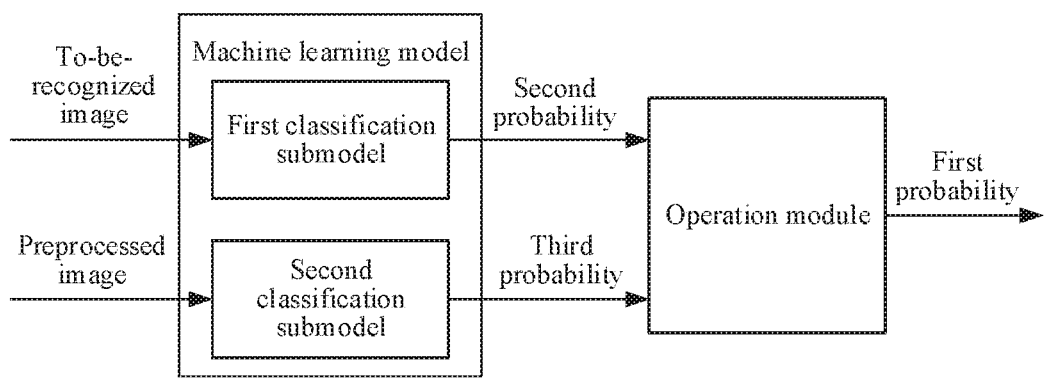
FIG. 4 is a schematic structural diagram of a machine learning model according to an embodiment.

In some embodiments, as shown in FIG. 4, the first submodel includes a first classification submodel, and the second submodel includes a second classification submodel. In this case, the foregoing step of obtaining, a first image feature corresponding to the to-be-recognized image, and obtaining, according to the first image feature, a second probability that the to-be-recognized image belongs to the classification category corresponding to the machine learning model may be implemented through the first classification submodel; and the foregoing step of obtaining, a second image feature corresponding to the preprocessed image, and obtaining, according to the second image feature, a third probability that the preprocessed image belongs to the classification category corresponding to the machine learning model may be implemented through the second classification submodel.

The first classification submodel may be used for performing image feature extraction on the to-be-recognized image, to obtain the first image feature corresponding to the to-be-recognized image, and determining, according to the first image feature, the second probability that the to-be-recognized image belongs to the classification category corresponding to the machine learning model. Similarly, the second classification submodel may be used for performing image feature extraction on the preprocessed image, to obtain the second image feature corresponding to the preprocessed image, and determining, according to the second image feature, the third probability that the preprocessed image belongs to the classification category corresponding to the machine learning model.

In some embodiments, the first classification submodel and the second classification submodel may maintain consistent model structures, and may only have different model parameters. Moreover, the model structures of the two may both use any suitable CNN model, and the CNN model is, for example, an inceptionV3 model, a RestNet model (or ResNet model), a VGG model, or a DenseNet model. In other embodiments, the first classification submodel and the second classification submodel may also have different model structures.

In this embodiment, after obtaining the to-be-recognized image and the preprocessed image, the computer device inputs the to-be-recognized image into the first classification submodel of the machine learning model, and inputs the preprocessed image into the second classification submodel of the machine learning model. Then, in the machine learning model, on one hand, the first classification submodel performs image feature extraction on the to-be-recognized image, to obtain the first image feature corresponding to the to-be-recognized image, then determines, according to the first image feature, the second probability that the to-be-recognized image belongs to the classification category corresponding to the machine learning model, and outputs the second probability; on the other hand, the second classification submodel performs image feature extraction on the preprocessed image, to obtain the second image feature corresponding to the preprocessed image, then determines, according to the second image feature, the third probability that the preprocessed image belongs to the classification category corresponding to the machine learning model, and outputs the third probability. Then, other functional modules (named operation modules in FIG. 4), of non-machine learning model, run by the computer device perform operations according to second probabilities outputted by the first classification submodel, and third probabilities outputted by the second classification submodel, to obtain the first probabilities that the to-be-recognized image belongs to the classification categories corresponding to the machine learning model respectively.

In addition, as described above, the machine learning model may include two input channels. In this case, the to-be-recognized image may be inputted into the first classification submodel of the machine learning model through one input channel, and the preprocessed image may be inputted into the second classification submodel of the machine learning model through the other input channel.

In some embodiments, the foregoing manner for preprocessing the to-be-recognized image includes at least one or a combination of at least two of the following steps:

adjusting, by the computer device, a target object in the to-be-recognized image to a reference object size;

cropping, by the computer device, an invalid region in the to-be-recognized image, to obtain an image not including the invalid region;

adjusting, by the computer device, the to-be-recognized image to a reference image size; and adjusting, by the computer device, an image attribute of the to-be-recognized image, the image attribute including at least one of a contrast and a grayscale.

For the to-be-recognized image, the computer device may perform preprocessing through any one or a combination of at least two of the foregoing steps, to highlight the details in the to-be-recognized image.

In some embodiments, the foregoing manner for preprocessing the to-be-recognized image may include the following steps: adjusting, by the computer device, a target object in the to-be-recognized image to a reference object size, to obtain a first adjusted image; cropping, by the computer device, an invalid region in the first adjusted image, to obtain a second adjusted image, the second adjusted image not including the invalid region; and adjusting, by the computer device, the second adjusted image to a reference image size, to obtain a third adjusted image, the preprocessed image being obtained according to the third adjusted image.

In this embodiment, the computer device may adjust a target object to a reference object size, to obtain a first adjusted image. Specifically, it may be implemented by scaling the target object included in the to-be-recognized image. The target object is image content included in the to-be-recognized image, and is the object that needs to be highlighted. It may be understood that, the target object may be set according to an actual application requirement. For example, for a character image, a mouth of the character in the image may be preset as the target object, and a fixed width value is used as the reference object size. In this case, when the image Mona Lisa of Da Vinci is used as the to-be-recognized image, the mouth part of the character Mona Lisa in the image may be scaled, to adjust the size of the mouth part to the fixed width value. In another example, for a fundus image, eyeballs in the image may be preset as the target object, and a fixed radius value is used as the reference object size. In this case, for any fundus image of the to-be-recognized image, the eyeballs in the fundus image may be scaled, to adjust the radius of the eyeballs in the fundus image to the fixed radius value. In some embodiments, the reference object size may be the size of a preset object, or may be sizes of other objects than the target object in the to-be-recognized image. For example, for the fundus image, one eyeball may be set as the target object, and the other eyeball may be set as the reference object, so that one eyeball in the fundus image may be adjusted to be the size of the other eyeball.

Then, the computer device crops an invalid region in the first adjusted image (that is, the image obtained after the target object of the to-be-recognized image is adjusted to the reference object size), to obtain a second adjusted image, the second adjusted image not including the invalid region. That is, the computer device crops the invalid region in the first adjusted image, and the image that does not include the invalid region and that is remained after the cropping is the second adjusted image. The invalid region is an image region in which the task of determining the first probability that the to-be-recognized image belongs to the classification category corresponding to the machine learning model does not have any positive effect. In some embodiments, the invalid region may include a region not having valid content information, for example, a blank region.

Then, the second adjusted image (that is, the image obtained after the invalid region in the first adjusted image is cropped) is adjusted to the reference image size, to obtain a third adjusted image. In some embodiments, the third adjusted image is a preprocessed image. When training the machine learning model, the computer device may set an image size of a training image inputted into the machine learning model. Accordingly, training the machine learning model according to the training images (input of a fixed size) of the uniform image size can greatly reduce the complexity of the machine learning model. Based on this, when performing image recognition on the to-be-recognized image, the computer device may query for the reference image size associated with the machine learning model, and then, in the process of preprocessing the to-be-recognized image, may compare a current image size of the second adjusted image with the reference image size. When the current image size and the reference image size are inconsistent, the computer device may adjust the current image size to the reference image size. For example, the reference image size may be a resolution of 512*512.

The setting for the image size of the training image used herein for uniformly training the machine learning model is not a limitation on the image size of the training image. Alternatively, the image sizes of the training images for training the machine learning model may not be the uniform image size.

In some embodiments, the foregoing manner for preprocessing the to-be-recognized image may further include the following step: adjusting an image attribute of a target adjusted image, the target adjusted image including any one of the first adjusted image, the second adjusted image, and the third adjusted image, and the image attribute including at least one of a contrast and a grayscale.

Specifically, in the process of preprocessing the to-be-recognized image, in addition to the three processing steps of adjusting the target object included in the image to the reference object size, removing the invalid region in the image, and adjusting the image to the reference image size, the contrast of the image may be further adjusted. Alternatively, in addition to the three processing steps, the grayscale of the image may be further adjusted. Alternatively, in addition to the three steps, both the contrast of the image and the grayscale of the image may be further adjusted. In addition, the image attribute is also not limited to the contrast and the grayscale. In other embodiments, the image attribute may further include brightness, and in this case, the image attribute includes at least one of the contrast, the grayscale, and the brightness.

Adjusting the contrast of the image may be specifically performing the following processing on pixel values (R, G, B) of pixels in the image: subtracting the average value in the pixel range of the pixel, and multiplying each pixel value by a value, to increase the distinction among the pixels. It may be understood that, the value may be set according to an actual application requirement, for example, may be set to 4. In addition, when the grayscale of the image is adjusted, the grayscale of the image may be increased by 50%. By adjusting the image attribute of the target adjusted image, the feature of the target adjusted image may be highlighted. Using the fundus image as an example, after the contrast and the grayscale of the fundus image are adjusted as above, a blood vessel part, a texture feature, and the like in the fundus image can be more highlighted.

The step of adjusting the image attribute may be arranged before the step of adjusting the target object to the reference object size. That is, the image attribute of the to-be-recognized image is first adjusted, then the target object in the adjusted to-be-recognized image is adjusted to the reference object size, to obtain the first adjusted image, and further subsequent processing is performed according to the first adjusted image. Alternatively, the step of adjusting the image attribute may follow any one of the three steps of adjusting the target object to the reference object size, cropping the invalid region in the image, and adjusting the image to the reference image size, for example, follow the step of cropping the invalid region in the image. That is, the image attribute of the second adjusted image is adjusted, and the second adjusted image with the adjusted image attribute is adjusted to the reference image size, to obtain the third adjusted image.

In some embodiments, a quantity of the preprocessed images is greater than 1, and the preprocessed images are obtained according to different preprocessing manners.

It may be understood that, in the process of performing image recognition on any to-be-recognized image, if only a single preprocessing manner is used for preprocessing the to-be-recognized image, the quantity of obtained preprocessed images is equal to 1.

In this embodiment, in the process of performing image recognition on any to-be-recognized image, more than two different preprocessing manners may be used for preprocessing the to-be-recognized image respectively. In this case, for each preprocessing manner, a corresponding preprocessed image may be obtained, and accordingly, after various different preprocessing manners are used for preprocessing the to-be-recognized image respectively, a total quantity of obtained preprocessed images respectively corresponding to (one-to-one correspondence) the various preprocessing manners is more than two correspondingly. For example, the three different preprocessing manners of a preprocessing manner W1, a preprocessing manner W2, and a preprocessing manner W3 may be used for preprocessing a to-be-recognized image PO respectively, to obtain a preprocessed image Pd uniquely corresponding to the preprocessing manner W1, a preprocessed image Pd2 uniquely corresponding to the preprocessing manner W2, and a preprocessed image Pd3 uniquely corresponding to the preprocessing manner W3 (which is briefly referred to as an example E-3).

Then, the computer device may input the to-be-recognized image and the preprocessed images into the machine learning model, and obtain, through the machine learning model, a first image feature corresponding to the to-be-recognized image, and second image features corresponding to the preprocessed images respectively. Then, the computer device determines, according to the first image feature corresponding to the to-be-recognized image, and the second image features corresponding to the preprocessed images respectively jointly, the first probability that the to-be-recognized image belongs to the classification category corresponding to the machine learning model.

Through different preprocessing manners, information included in the to-be-recognized image can be further mined, to further improve the accuracy of the output result of the model.

In a case that the machine learning model includes the first feature detection submodel, the second feature detection submodel, the first fully connected layer, the second fully connected layer, and the output layer that are described above, both a quantity of the second feature detection submodels and a quantity of the second fully connected layers match a quantity of the preprocessed images. Specifically, when the quantity of the preprocessed images is equal to 1, both the quantity of the second feature detection submodels and the quantity of the second fully connected layers are equal to 1; and when the quantity of the preprocessed images is greater than 1, both the quantity of the second feature detection submodels and the quantity of the second fully connected layers are greater than 1, and may be consistent with the quantity of the preprocessed images.

Figure 5:
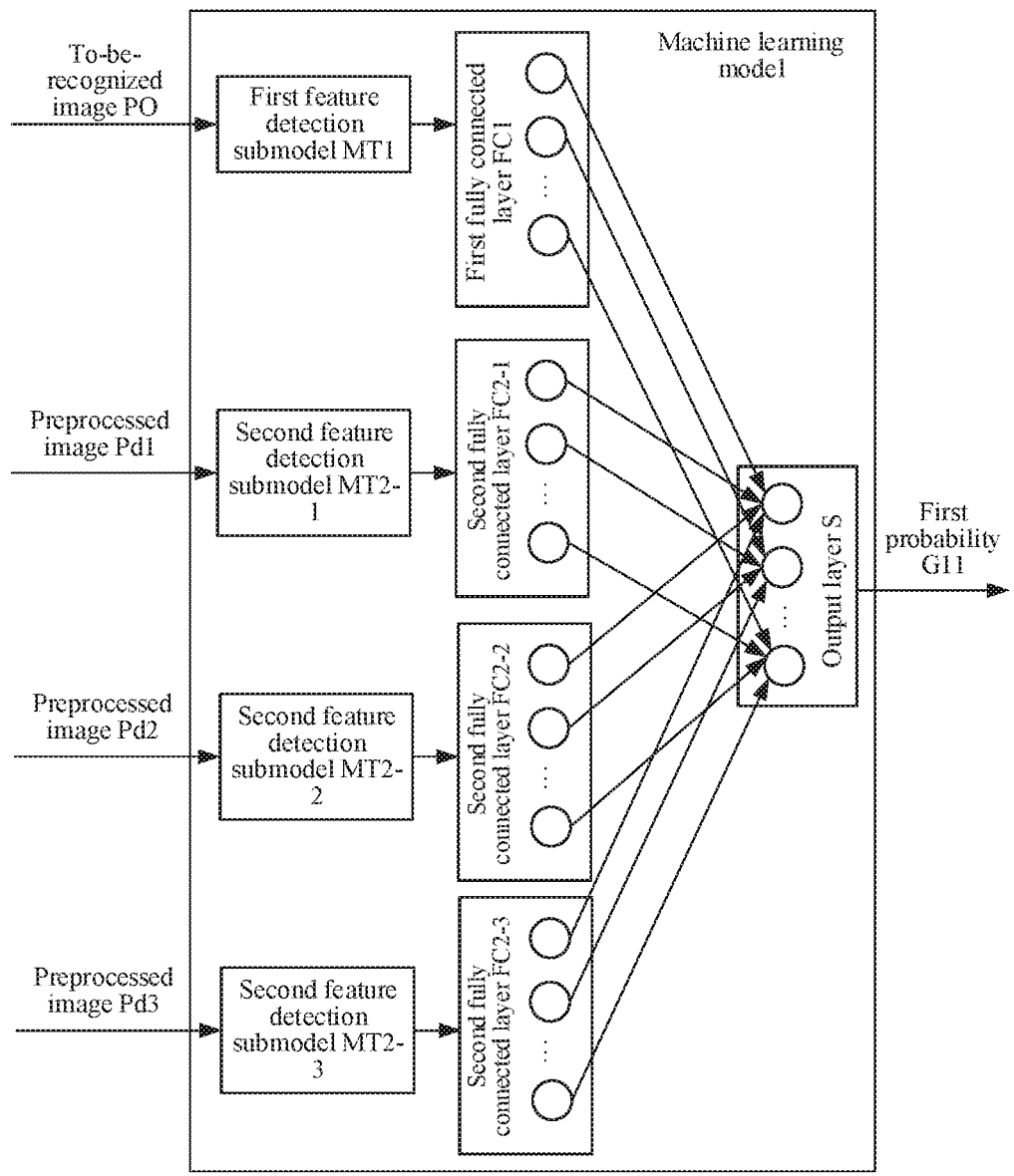
FIG. 5 is a schematic structural diagram of a machine learning model according to an embodiment.

For example, for example E-3, as shown in FIG. 5, the machine learning model includes a first feature detection submodel MT1 used for obtaining a first image feature F1 corresponding to the to-be-recognized image PO, a second feature detection submodel MT2-1 used for obtaining a second image feature F21-1 corresponding to the preprocessed image Pd1, a second feature detection submodel MT2-2 used for obtaining a second image feature F21-2 corresponding to the preprocessed image Pd2, a second feature detection submodel MT2-3 used for obtaining a second image feature F21-3 corresponding to the preprocessed image Pd3, a first fully connected layer FC1, a second fully connected layer FC2-1, a second fully connected layer FC2-2, a second fully connected layer FC2-3, and an output layer S. The first feature detection submodel MT1 is connected to the first fully connected layer FC1, the second feature detection submodel MT2-1 is connected to the second fully connected layer FC2-1, the second feature detection submodel MT2-2 is connected to the second fully connected layer FC2-2, and the second feature detection submodel MT2-3 is connected to the second fully connected layer FC2-1. Moreover, the first fully connected layer FC1, the second fully connected layer FC2-1, the second fully connected layer FC2-2, and the second fully connected layer FC2-3 are all connected to the output layer S. Based on this, the output layer S determines, according to an output result of the first fully connected layer FC1, an output result of the second fully connected layer FC2-1, an output result of the second fully connected layer FC2-2, the output result of the second fully connected layer FC2-3 jointly, a first probability G11 that the to-be-recognized image PO belongs to the classification category corresponding to the machine learning model.

In a case that the machine learning model includes the first classification submodel and the second classification submodel that are described above, a quantity of the second classification submodels matches a quantity of the preprocessed images. Specifically, when the quantity of the preprocessed images is greater than 1, the quantity of the second classification submodels is greater than 1, and is consistent with the quantity of the preprocessed images. Based on this, the computer device may perform an operation according to second probabilities outputted by the first classification submodel, and third probabilities outputted by the second classification submodels, to obtain first probabilities that the to-be-recognized image belongs to the classification categories corresponding to the machine learning model.

Figure 6:
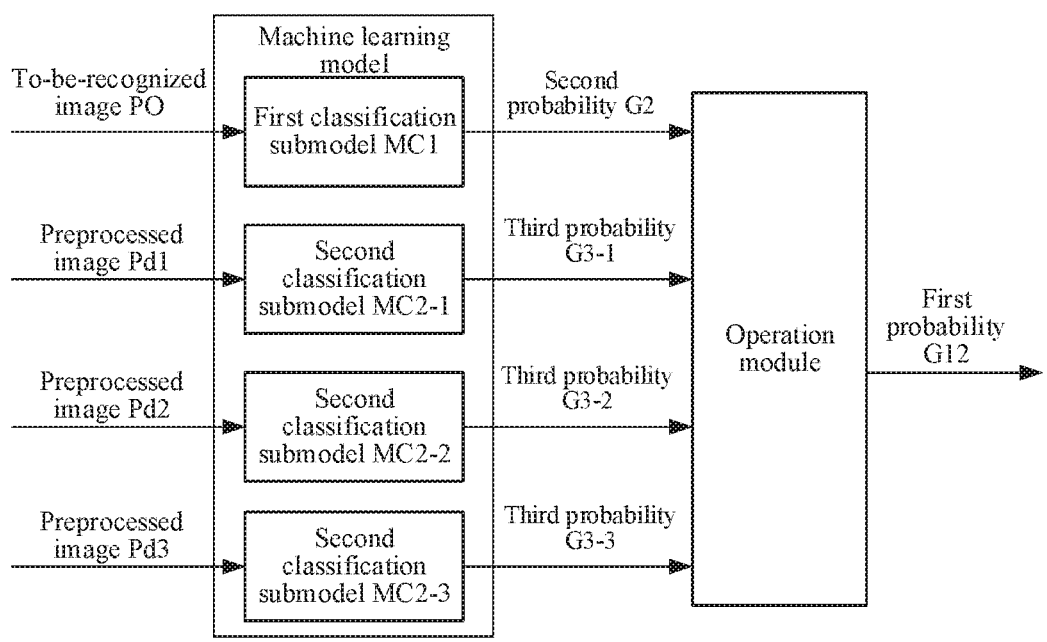
FIG. 6 is a schematic structural diagram of a machine learning model according to an embodiment.

For example, for the example E-3, as shown in FIG. 6, the machine learning model includes a first classification submodel MC1, a second classification submodel MC2-1, a second classification submodel MC2-2, and a second classification submodel MC2-3. The first classification submodel MC1 is used for performing image feature extraction on the to-be-recognized image PO, to obtain the first image feature F1 corresponding to the to-be-recognized image PO, and determining, according to the first image feature F1, a second probability G2 that the to-be-recognized image PO belongs to the classification category corresponding to the machine learning model; the second classification submodel MC2-1 is used for performing image feature extraction on the preprocessed image Pd1, to obtain the second image feature F21-1 corresponding to the preprocessed image Pd1, and determining, according to the second image feature F21-1, a third probability G3-1 that the preprocessed image Pd1 belongs to the classification category corresponding to the machine learning model; the second classification submodel MC2-2 is used for performing image feature extraction on the preprocessed image Pd2, to obtain the second image feature F21-2 corresponding to the preprocessed image Pd2, and determining, according to the second image feature F21-2, a third probability G3-2 that the preprocessed image Pd2 belongs to the classification category corresponding to the machine learning model; and the second classification submodel MC2-3 is used for performing image feature extraction on the preprocessed image Pd3, to obtain the second image feature F21-3 corresponding to the preprocessed image Pd3, and determining, according to the second image feature F21-3, a third probability G3-3 that the preprocessed image Pd3 belongs to the classification category corresponding to the machine learning model. Based on this, the computer device may perform an operation on the second probability G2 outputted by the first classification submodel MC1, the third probability G3-1 outputted by the second classification submodel MC2-1, the third probability G3-2 outputted by the second classification submodel MC2-2, and the third probability G3-3 outputted by the second classification submodel MC2-3, and determine the first probability G12 that the to-be-recognized image PO belongs to the classification category corresponding to the machine learning model.

The machine learning model may include more than three input channels. Accordingly, the to-be-recognized image may be inputted into the machine learning model through one input channel in the machine learning model, and the preprocessed images corresponding to the preprocessing manners may be inputted into the machine learning model respectively through other input channels than the input channel in the machine learning model.

In some embodiments, the to-be-recognized image may be inputted into the first feature detection submodel of the machine learning model through one input channel in the machine learning model, and the preprocessed images in a one-to-one correspondence to the preprocessing manners may be inputted into respective corresponding second feature detection submodels through other input channels than the input channel.

In some embodiments, the to-be-recognized image may be inputted into the first classification submodel of the machine learning model through one input channel in the machine learning model, and the preprocessed images in a one-to-one correspondence to the preprocessing manners may be inputted into respective corresponding second classification submodels through other input channels than the input channel.

Figure 7:
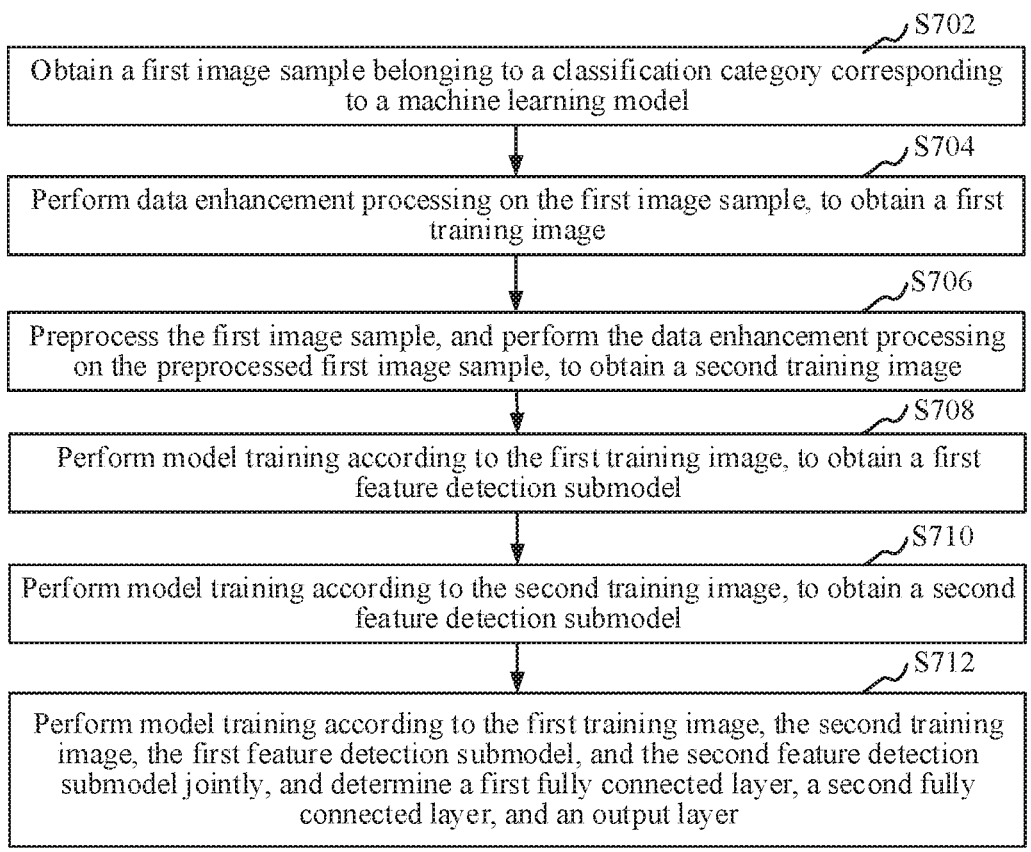
FIG. 7 is a schematic flowchart of a step of determining a machine learning model according to an embodiment.

In some embodiments, as shown in FIG. 7, the manner for determining the machine learning model may include the following steps S702 to S712. S702. Obtain a first sample image belonging to a classification category corresponding to a machine learning model. S704. Perform data enhancement processing on the first sample image, to obtain a first training image. S706. Preprocess the first sample image, and perform the data enhancement processing on the preprocessed first sample image, to obtain a second training image. S708. Perform model training according to the first training image, to obtain a first feature detection submodel. S710. Perform model training according to the second training image, to obtain a second feature detection submodel. S712. Perform model training according to the first training image, the second training image, the first feature detection submodel, and the second feature detection submodel jointly, to determine a first fully connected layer, a second fully connected layer, and an output layer.

The first sample image is an unprocessed sample image. The first sample image is an image of which a real classification result is known. The computer device may obtain classification labels of first sample images. The classification label is used for representing a known real classification result corresponding to the sample image, that is, for any first sample image, the classification label may be used for determining a classification category to which the first sample image really belongs. In some embodiments, the real classification result represented by the classification label may be determined through manual analysis, for example, determined through analysis of experts in the field of the related art.

The first training image is a first sample image obtained after data enhancement processing is performed, that is, an image obtained after data enhancement processing is performed on the first sample image. It may be understood that, the classification label of the first training image is consistent with the classification label of the corresponding first sample image.

The second training image is a first sample image obtained after preprocessing is performed first and then data enhancement processing is performed, that is, an image obtained after the first sample image is preprocessed first and then data enhancement processing is performed on the preprocessed first sample image. It may be understood that, the classification label of the second training image is consistent with the classification label of the corresponding first sample image.

Data enhancement processing is performed on both the first sample image and the preprocessed first sample image. One objective is to expand the amount of training data, and the other objective is to improve a generalization capability of the machine learning model obtained through training.

In this embodiment, the computer device may perform model training according to the first training image, to obtain a first feature detection submodel, and perform model training according to the second training image, to obtain a second feature detection submodel. Then, the computer device performs model integration processing, so that the end of the first feature detection submodel is connected to one fully connected layer, the end of the second feature detection submodel is connected to the other fully connected layer, and the two fully connected layers are connected to one output layer, and initializes the two fully connected layer and one output layer. Then, in a case that the model parameter of the first feature detection submodel and the model parameter of the second feature detection submodel maintain unchanged, model training is performed according to the first training image, the second training image, the first feature detection submodel, and the second feature detection submodel, to determine the model parameters of the two fully connected layers and the model parameter of the output layer jointly. It may be understood that, when the model parameters of the two fully connected layers and the model parameter of the output layer are determined, the first fully connected layer, the second fully connected layer, and the output layer are determined, so that the entire machine learning model is determined.

Specifically, the computer device may perform supervised model training by using the first training image and the second training image. Moreover, in the training process, according to the difference between the classification label and the classification result that is automatically determined by the machine learning model, the model parameter of the machine learning model is adjusted and training continues, and the training ends until a training stop condition is met. The model parameter obtained when the training ends may be the model parameter of the machine learning model. Specifically, the classification result that is automatically determined by the machine learning model and the classification label of the corresponding sample may be compared through the softmax layer of the machine learning model, and a loss function is further calculated. Then, gradient back propagation is performed according to the loss function, to adjust the model parameter of the machine learning model. The loss function may be any suitable loss function, for example, a cross entropy loss function.

The training stop condition is a condition in which model training ends. The training stop condition may be reaching a preset iteration quantity, or that a classification performance indicator of a machine learning model with the adjusted model parameter reaches a preset indicator.

In addition, the process of performing model training according to the first training image to obtain the first feature detection submodel may adopt deep learning. When deep learning is adopted for model training, the training may specifically be implemented by using any suitable deep learning manner. For example, a transfer learning manner may be used, that is, during transfer training, the underlying network is used as a feature extractor. In another example, a fine tune manner may be used, that is, during transfer training, all or most layers are trained.

In some embodiments, the computer device may train and store a machine learning model, and may directly obtain and use the machine learning model in need of using the machine learning model. Alternatively, the computer device may only store the model parameter of the machine learning model, and when needing to use the machine learning model, obtain and use the machine learning model after obtaining the model parameter and importing the model parameter into an initial machine learning model.

According to the sample and the classification label added to the sample, supervised training is performed to obtain the machine learning model, which improves the classification accuracy of the machine learning model compared with an unsupervised training mode. In addition, compared with the conventional supervised training mode, the input feature of the machine learning model is prevented from being manually defined, and the training efficiency and accuracy of the machine learning model are improved.

Figure 8:
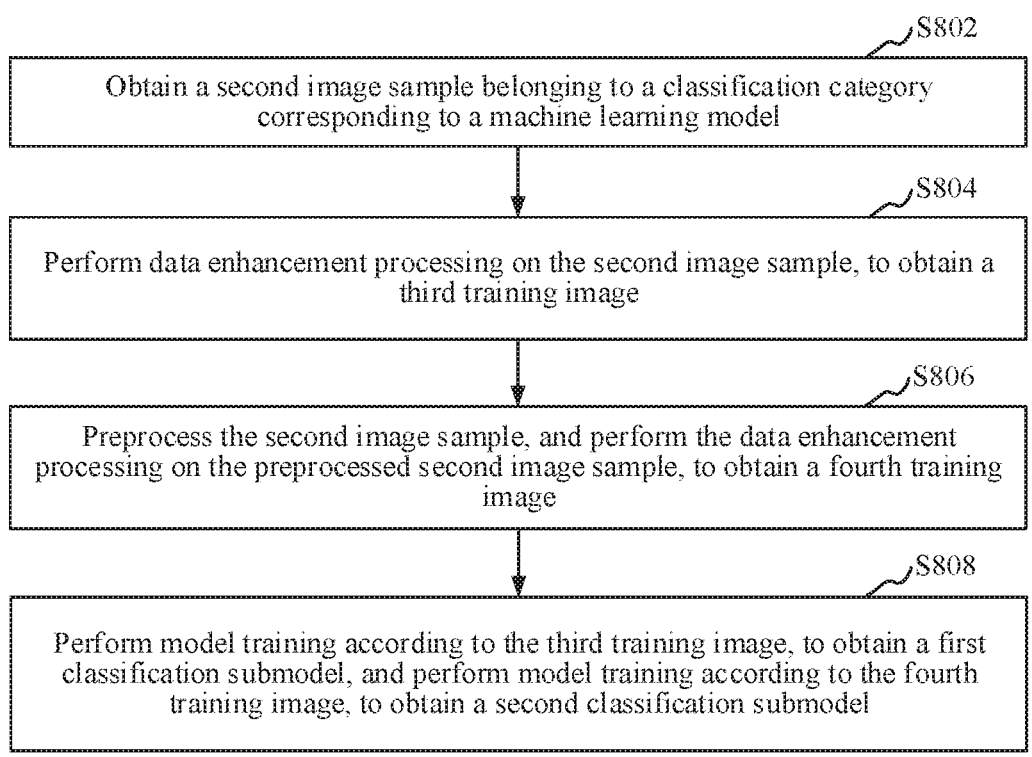
FIG. 8 is a schematic flowchart of a step of determining a machine learning model according to an embodiment.

In some embodiments, as shown in FIG. 8, the manner for determining the machine learning model may include the following steps S802 to S808. S802. Obtain a second sample image belonging to a classification category corresponding to a machine learning model. S804. Perform data enhancement processing on the second sample image, to obtain a third training image. S806. Preprocess the second sample image, and perform the data enhancement processing on the preprocessed second sample image, to obtain a fourth training image. S808. Perform model training according to the third training image, to obtain a first classification submodel, and perform model training according to the fourth training image, to obtain a second classification submodel.

The main difference between this embodiment and the embodiment in FIG. 7 lies in that: model structures of machine learning models that need to be trained are different. In this embodiment, the machine learning model obtained through training includes the first classification submodel and the second classification submodel. Based on this, in the model training process, after model training is performed according to the third training image, to obtain the first classification submodel, and model training is performed according to the fourth training image, to obtain the second classification submodel, the entire machine learning model is determined.

The limitation on the second sample image in this embodiment may be the same as the specific limitation on the foregoing first sample image, and the terms "first" and "second" are only distinctions on naming in different embodiments. In addition, the third training image is similar to the situation of the foregoing first training image, and the fourth training image is also similar to the situation of the foregoing second training image. Moreover, in this embodiment, for other content than the content involving the model structure of the machine learning model, reference may be made to the limitation on the embodiment in FIG. 7.

In some embodiments, the manner for performing data enhancement processing on the image may include the following steps: obtaining a first transformation parameter corresponding to a geometric transformation manner; and performing geometric transformation processing on the image according to the first transformation parameter and the geometric transformation manner corresponding to the first transformation parameter.

The geometric transformation manner is an image transformation manner in which the pixel values of the image do not change. The geometric transformation manner may include at least one of image flipping, image cropping, image scaling, and image rotation. The first transformation parameter is an operation parameter involved in the geometric transformation processing, for example, an image rotation angle value, or an image scaling ratio value. The first transformation parameter may be random, or certainly may be preset.

Specifically, the step of performing geometric transformation processing on the image may include at least one of the following: flipping the image in a direction according to a flipping probability; cropping borders of the image according to a random cropping parameter; adjusting an image size of the image according to a random image size adjustment value; and rotating the image according to a random rotation angle value.

Moreover, the image is flipped in a direction according to the flipping probability. For example, the image is left-right flipped or up-down flipped according to a probability of 50%. According to a random cropping parameter, borders of the image are cropped, for example, border cropping is performed on the height and the width of the image by 0% to 20%. According to the image size adjustment value, the image size of the image is adjusted, for example, the image size of the image is scaled to 90% to 110% of the raw image and according to the random rotation angle value, the image is rotated, for example, the image is randomly rotated by −180° to 180°.

In some embodiments, the manner for performing data enhancement processing on the image may include the following steps: obtaining a second transformation parameter corresponding to an image attribute adjustment manner; and performing image attribute adjustment processing on the image according to the second transformation parameter and the image attribute adjustment manner corresponding to the second transformation parameter.

The image attribute adjustment manner is an image transformation manner of changing the pixel values of the image. The image attribute adjustment manner may include at least one of adjusting the image brightness, adjusting the image contrast, and the like. The second transformation parameter is an operation parameter involved in the image attribute adjustment processing, for example, an image brightness value or an image contrast value. The second transformation parameter may be random, or certainly may be preset.

Specifically, the step of performing image attribute adjustment processing on the image may include at least one of the following: adjusting brightness of pixels in the image according to a random brightness adjustment value; and adjusting contrasts of the pixels in the image according to a contrast adjustment value.

Moreover, according to the random brightness adjustment value, the brightness of the pixels in the image is adjusted. For example, a brightness value of the pixels in the image is randomly increased by −20 to 20. According to the contrast adjustment value, the contrast of the pixels in the image is adjusted, for example, the pixels in the image are multiplied by a random value between 0.8 and 1.2.

Figure 9:
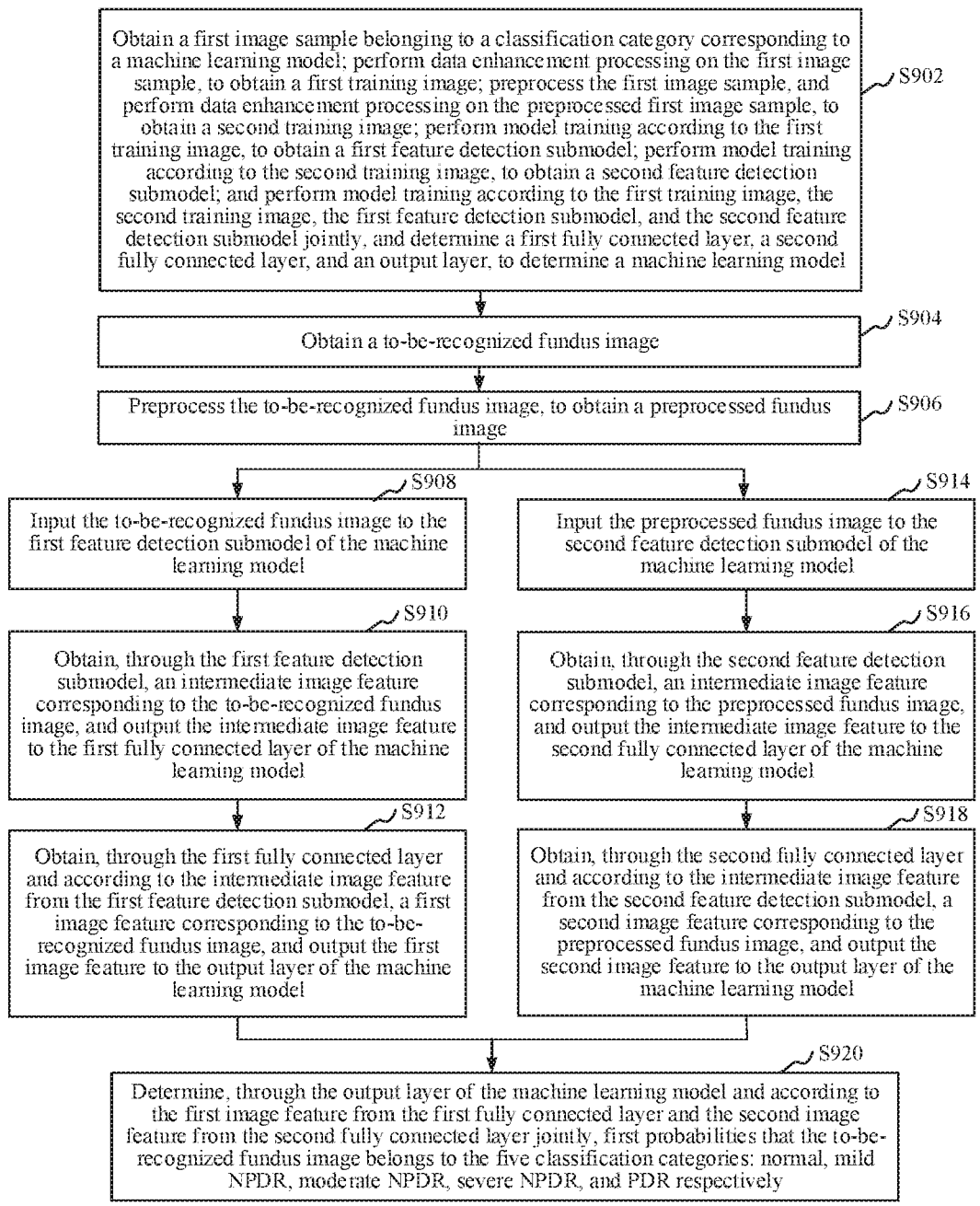
FIG. 9 is a schematic flowchart of an image recognition method according to an embodiment.

In some embodiments, as shown in FIG. 9, an image recognition method is provided. An example in which a to-be-recognized image in the method is a fundus image is used for description. The method may specifically include the following step S902 to step S920.

S902. Obtain a first sample image belonging to a classification category corresponding to a machine learning model; perform data enhancement processing on the first sample image, to obtain a first training image; preprocess the first sample image, and perform data enhancement processing on the preprocessed first sample image, to obtain a second training image; perform model training according to the first training image, to obtain a first feature detection submodel; perform model training according to the second training image, to obtain a second feature detection submodel; and perform model training according to the first training image, the second training image, the first feature detection submodel, and the second feature detection submodel jointly, and determine a first fully connected layer, a second fully connected layer, and an output layer, to determine a machine learning model.

S904. Obtain a to-be-recognized fundus image.

S906. Preprocess the to-be-recognized fundus image, to obtain a preprocessed fundus image.

S908. Input the to-be-recognized fundus image to the first feature detection submodel of the machine learning model.

S910. Obtain, through the first feature detection submodel, an intermediate image feature corresponding to the to-be-recognized fundus image, and output the intermediate image feature to the first fully connected layer of the machine learning model.

S912. Obtain, through the first fully connected layer and according to the intermediate image feature from the first feature detection submodel, a first image feature corresponding to the to-be-recognized fundus image, and output the first image feature to the output layer of the machine learning model.

S914. Input the preprocessed fundus image to the second feature detection submodel of the machine learning model.

S916. Obtain, through the second feature detection submodel, an intermediate image feature corresponding to the preprocessed fundus image, and output the intermediate image feature to the second fully connected layer of the machine learning model.

S918. Obtain, through the second fully connected layer and according to the intermediate image feature from the second feature detection submodel, a second image feature corresponding to the preprocessed fundus image, and output the second image feature to the output layer of the machine learning model.

S920. Determine, through the output layer of the machine learning model and according to the first image feature from the first fully connected layer and the second image feature from the second fully connected layer jointly, first probabilities that the to-be-recognized fundus image belongs to the five classification categories: normal, mild NPDR, moderate NPDR, severe NPDR, and PDR respectively.

The limitation on the technical features in this embodiment may be same as the limitation on the corresponding technical features in the foregoing embodiments, and is not described herein again.

In the foregoing image recognition method, after a to-be-recognized fundus image is obtained, the to-be-recognized fundus image is preprocessed, a first image feature corresponding to the to-be-recognized fundus image and a second image feature corresponding to the preprocessed to-be-recognized fundus image are then obtained through a machine learning model respectively, and a probability that the to-be-recognized fundus image belongs to a classification category corresponding to the machine learning model is further determined according to the first image feature and the second image feature jointly. On one hand, the to-be-recognized fundus image is classified automatically through the machine learning model, which is more accurate than manual determining; on the other hand, the preprocessed to-be-recognized fundus image can highlight details in the image, both basic information in a to-be-recognized raw fundus image and detail information highlighted by the preprocessed to-be-recognized fundus image are used with reference to the first image feature and the second image feature. It may be seen that, the information in the to-be-recognized fundus image is fully mined, thereby further improving the recognition accuracy.

It is to be understood that, although the steps in the flowcharts of the foregoing embodiments are displayed in order according to arrows, the steps are not necessarily performed in the order indicated by the arrows. Unless explicitly specified in this application, the sequence for performing the steps is not strictly limited, and the steps may be performed in other sequences. Besides, at least some steps may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 10:
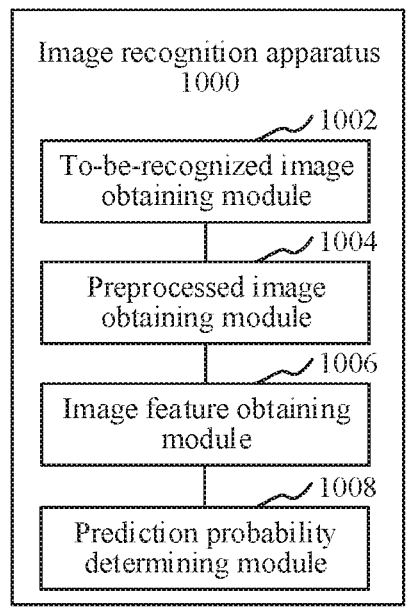
FIG. 10 is a schematic structural diagram of an image recognition apparatus according to an embodiment.

In some embodiments, as shown in FIG. 10, an image recognition apparatus 1000 is provided. The apparatus may include the following modules 1002 to 1008. A to-be-recognized image obtaining module 1002 is configured to obtain a to-be-recognized image; a preprocessed image obtaining module 1004 is configured to preprocess the to-be-recognized image, to obtain a preprocessed image; an image feature obtaining module 1006 is configured to obtain, through a first submodel in a machine learning model, a first image feature corresponding to the to-be-recognized image, and obtain, through a second submodel in the machine learning model, a second image feature corresponding to the preprocessed image; and a prediction probability determining module 1008 is configured to determine, according to the first image feature and the second image feature, a first probability that the to-be-recognized image belongs to a classification category corresponding to the machine learning model.

After obtaining a to-be-recognized image, the foregoing image recognition apparatus 1000 preprocesses the to-be-recognized image, then obtains, through a first submodel and a second submodel in a machine learning model respectively, a first image feature corresponding to the to-be-recognized image, and a second image feature corresponding to the preprocessed to-be-recognized image, and further determines, according to the first image feature and the second image feature jointly, a probability that the to-be-recognized image belongs to a classification category corresponding to the machine learning model. On one hand, the to-be-recognized image is classified automatically through the machine learning model, which is more accurate than manual determining; on the other hand, the preprocessed to-be-recognized image can highlight details in the image, both basic information in a raw to-be-recognized image and detail information highlighted by the preprocessed to-be-recognized image are used with reference to the first image feature and the second image feature. It may be seen that, the information in the to-be-recognized image is fully mined, thereby further improving the recognition accuracy.

In some embodiments, the prediction probability determining module 1008 may include the following units: an image feature output unit, configured to input the first image feature and the second image feature to an output layer of the machine learning model; and a first prediction probability determining unit, configured to determine, through the output layer of the machine learning model and according to the first image feature and the second image feature, the first probability that the to-be-recognized image belongs to the classification category corresponding to the machine learning model.

In some embodiment, the first submodel includes a first feature detection submodel, the second submodel includes a second feature detection submodel, and the machine learning model further includes: a first fully connected layer connected to the first feature detection submodel and a second fully connected layer connected to the second feature detection submodel, both the first fully connected layer and the second fully connected layer being connected to the output layer. In this case, the image feature obtaining module 1006 may be configured to obtain, through the first feature detection submodel and the first fully connected layer, a first image feature corresponding to the to-be-recognized image, and obtain, through the second feature detection submodel and the second fully connected layer, a second image feature corresponding to the preprocessed image.

In some embodiments, the prediction probability determining module 1008 may include the following units: a second prediction probability determining unit, configured to obtain, through the machine learning model and according to the first image feature, a second probability that the to-be-recognized image belongs to the classification category corresponding to the machine learning model; a third prediction probability determining unit, configured to obtain, through the machine learning model and according to the second image feature, a third probability that the preprocessed image belongs to the classification category corresponding to the machine learning model; and a fourth prediction probability determining unit, configured to perform an operation according to the second probability and the third probability, and determine the first probability that the to-be-recognized image belongs to the classification category corresponding to the machine learning model.

In some embodiments, the first submodel includes a first classification submodel, and the second submodel includes a second classification submodel. In this case, the second prediction probability determining unit may be configured to obtain, through the first classification submodel, a first image feature corresponding to the to-be-recognized image, and obtain, according to the first image feature, a second probability that the to-be-recognized image belongs to the classification category corresponding to the machine learning model; and the third prediction probability determining unit may be configured to obtain, through the second classification submodel, a second image feature corresponding to the preprocessed image, and obtain, according to the second image feature, a third probability that the preprocessed image belongs to the classification category corresponding to the machine learning model.

In some embodiments, the preprocessed image obtaining module 1004 may include the following units: a first adjusted image obtaining unit, configured to adjust a target object in the to-be-recognized image to a reference object size, to obtain a first adjusted image; a second adjusted image obtaining unit, configured to crop an invalid region in the first adjusted image, to obtain a second adjusted image, the second adjusted image not including the invalid region; and a third adjusted image obtaining unit, configured to adjust the second adjusted image to a reference image size, to obtain a third adjusted image, the preprocessed image being obtained according to the third adjusted image.

In some embodiments, the preprocessed image obtaining module 1004 may further include an image attribute adjustment unit, configured to adjust an image attribute of a target adjusted image, the target adjusted image including any one of the first adjusted image, the second adjusted image, and the third adjusted image, and the image attribute including at least one of a contrast and a grayscale.

In some embodiments, a quantity of the preprocessed images is greater than 1, and the preprocessed images are obtained according to different preprocessing manners.

In some embodiments, the image recognition apparatus 1000 may further include a first model training module, and the first model training model may include the following units: a first sample obtaining unit, configured to obtain a first sample image belonging to a classification category corresponding to a machine learning model; a first training image obtaining unit, configured to perform data enhancement processing on the first sample image, to obtain a first training image; a second training image obtaining unit, configured to preprocess the first sample image, and perform data enhancement processing on the preprocessed first sample image, to obtain a second training image; a first submodel training unit, configured to perform model training according to the first training image, to obtain a first feature detection submodel; a second submodel training unit, configured to perform model training according to the second training image, to obtain a second feature detection submodel; and a first model determining unit, configured to perform model training according to the first training image, the second training image, the first feature detection submodel, and the second feature detection submodel jointly, and determine a first fully connected layer, a second fully connected layer, and an output layer.

In some embodiments, the image recognition apparatus 1000 may further include a second model training module, and the second model training model may include the following units: a second sample obtaining unit, configured to obtain a second sample image belonging to a classification category corresponding to a machine learning model; a third training image obtaining unit, configured to perform data enhancement processing on the second sample image, to obtain a third training image; a fourth training image obtaining unit, configured to preprocess the second sample image, and perform data enhancement processing on the preprocessed first sample image, to obtain a fourth training image; and a second model determining unit, configured to perform model training according to the third training image, to obtain a first classification submodel, and perform model training according to the fourth training image, obtain a second classification submodel.

In some embodiments, the manner for performing data enhancement processing on the image by the first training image obtaining unit or the third training image obtaining unit may include at least one of the following: flipping the image in a direction according to a flipping probability; cropping borders of the image according to a random cropping parameter; adjusting brightness of pixels in the image according to a random brightness adjustment value; adjusting contrasts of the pixels in the image according to a random contrast adjustment value; adjusting an image size of the image according to a random image size adjustment value; and rotating the image according to a random rotation angle value.

In some embodiments, the to-be-recognized image includes a medical image; and the machine learning model includes a CNN model.

For the specific limitation on the technical features involved in the foregoing image recognition apparatus 1000, reference may be made to the limitation on the corresponding technical features involved in the foregoing image recognition method. This is not described herein again. In addition, the modules in the foregoing image recognition apparatus 1000 may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided, including a memory and a processor, the memory storing a computer program, the computer program, when executed by the processor, causing the processor to perform the steps of the image recognition method in any embodiment of this application.

In a specific example, the computer device may be the server 120 shown in FIG. 1. An internal structure diagram of the computer device may be shown in FIG. 11. The computer device includes a processor, a memory, and a network interface connected through a system bus. The processor is configured to provide computation and control abilities. The memory includes a non-volatile storage medium and an internal memory. The non-volatile storage medium stores an operating system, a computer program, and a database, and the internal memory provides an environment for running the operating system and the computer program in the non-volatile storage medium. The network interface is configured to connect to and communicate with an external terminal by using a network. The computer program, when executed by the processor, causes the processor to implement the image recognition method provided in any embodiment of this application.

Figure 11:
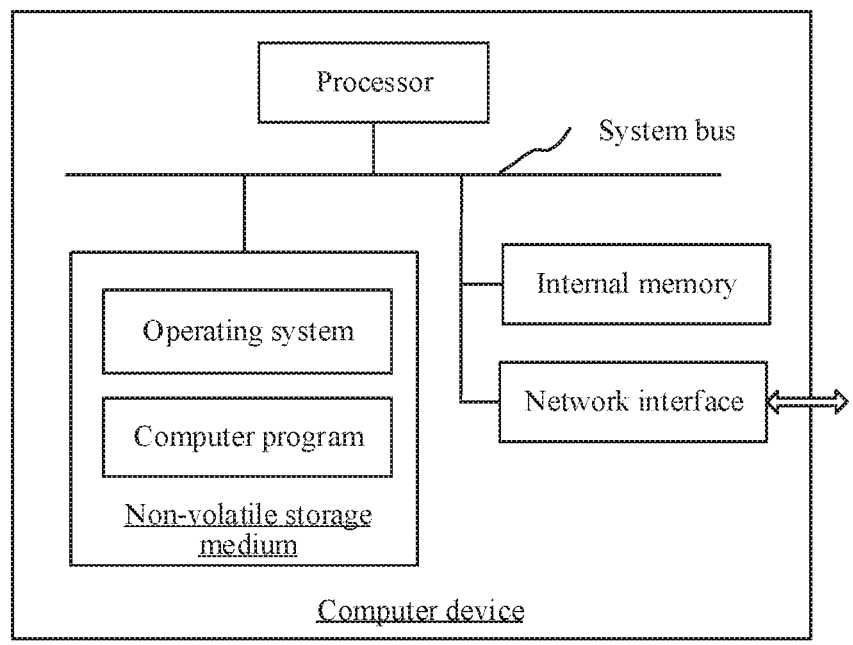
FIG. 11 is a schematic structural diagram of a computer device according to an embodiment.

A person skilled in the art may understand that, the structure shown in FIG. 11 is only a block diagram of a partial structure related to the solution in this application, and does not limit the computer device to which the solution of this application is applied. Specifically, the computer device may include more components or fewer components than those shown in the figure, or some components may be combined, or a different component deployment may be used.

In some embodiments, the image recognition apparatus 1000 provided in this application may be implemented in a form of a computer program, and the computer program may be run on the computer device shown in FIG. 11. The memory of the computer device may store program modules forming the image recognition apparatus 1000, for example, the to-be-recognized image obtaining module 1002, the preprocessed image obtaining module 1004, the image feature obtaining module 1006, and the prediction probability determining module 1008 shown in FIG. 10. The computer program formed by the program modules causes the processor to perform the steps in the image recognition method in the embodiments of this application described in this specification. For example, the computer device shown in FIG. 11 may perform step S202 through the to-be-recognized image obtaining module 1002 in the image recognition apparatus 1000 shown in FIG. 10, perform step S204 through the preprocessed image obtaining module 1004, perform step S206 through the image feature obtaining module 1006, perform step S208 through the prediction probability determining module 1008, and the like.

A person of ordinary skill in the art may understand that all or some of the procedures of the methods in the embodiments may be implemented by a computer program instructing relevant hardware. The program may be stored in a non-transitory computer-readable storage medium. When the program is run, the procedures of the methods in the embodiments are performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SL-DRAM), a Rambus direct RAM (RDRAM), a direct Rambus dynamic RAM (DRDRAM), and a Rambus dynamic RAM (DRAM).

Therefore, in some embodiments, a non-transitory computer-readable storage medium is provided, storing a plurality of computer programs, and the computer programs, when executed by a processor, causes the processor to perform the steps in the image recognition method provided in any embodiment of this application.

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, and are described in detail, but they shall not be construed as a limitation to the patent scope of this application. A person of ordinary skill in the art may further make variations and improvements without departing from the ideas of this application, which all fall within the protection scope of this application. Therefore, the protection scope of this application shall be subject to the appended claims.

What is claimed is:

1. An image recognition method, comprising:
    obtaining, by a computer device, a to-be-recognized image;
    preprocessing, by the computer device, the to-be-recognized image, to obtain a preprocessed image, to highlight details in the to-be-recognized image;
    obtaining, by the computer device through a first submodel in a machine learning model, a first image feature corresponding to the to-be-recognized image, and obtaining, through a second submodel in the machine learning model, a second image feature corresponding to the preprocessed image; and
    determining, by the computer device according to the first image feature and the second image feature, a first probability that the to-be-recognized image belongs to a classification category corresponding to the machine learning model, further including:
    inputting, by the computer device, the first image feature and the second image feature into an output layer of the machine learning model; and
    determining, by the computer device through the output layer of the machine learning model and according to the first image feature and the second image feature, the first probability that the to-be-recognized image belongs to the classification category corresponding to the machine learning model.

2. The method according to claim 1, wherein the first submodel comprises a first feature detection submodel, the second submodel comprises a second feature detection submodel, and the machine learning model further comprises: a first fully connected layer connected to the first feature detection submodel and a second fully connected layer connected to the second feature detection submodel, both the first fully connected layer and the second fully connected layer being connected to the output layer of the machine learning model;
    the computer device implements, through the first feature detection submodel and the first fully connected layer, the operation of obtaining a first image feature corresponding to the to-be-recognized image; and the computer device implements, through the second feature detection submodel and the second fully connected layer, the operation of obtaining a second image feature corresponding to the preprocessed image.

3. The method according to claim 2, wherein the machine learning model is determined by:
   obtaining, by the computer device, a first sample image belonging to the classification category corresponding to the machine learning model;
   performing, by the computer device, data enhancement processing on the first sample image, to obtain a first training image;
   preprocessing, by the computer device, the first sample image, and performing the data enhancement processing on the preprocessed first sample image, to obtain a second training image;
   performing, by the computer device, model training according to the first training image, to obtain the first feature detection submodel;
   performing, by the computer device, model training according to the second training image, to obtain the second feature detection submodel; and
   performing, by the computer device, model training according to the first training image, the second training image, the first feature detection submodel, and the second feature detection submodel jointly, to determine the first fully connected layer, the second fully connected layer, and the output layer.

4. The method according to claim 3, wherein the performing, by the computer device, data enhancement processing on the second sample image comprises:
   obtaining, by the computer device, a first transformation parameter corresponding to a geometric transformation manner; and
   performing, by the computer device, geometric transformation processing on the second sample image according to the first transformation parameter and the geometric transformation manner corresponding to the first transformation parameter.

5. The method according to claim 3, wherein the performing, by the computer device, data enhancement processing on the second sample image comprises:
   obtaining, by the computer device, a second transformation parameter corresponding to an image attribute adjustment manner; and
   performing, by the computer device, image attribute adjustment processing on the second sample image according to the second transformation parameter and the image attribute adjustment manner corresponding to the second transformation parameter.

6. The method according to claim 1, wherein the determining, by the computer device according to the first image feature and the second image feature, a first probability that the to-be-recognized image belongs to a classification category corresponding to the machine learning model comprises:
   obtaining, by the computer device through the machine learning model and according to the first image feature, a second probability that the to-be-recognized image belongs to the classification category corresponding to the machine learning model;
   obtaining, by the computer device through the machine learning model and according to the second image feature, a third probability that the preprocessed image belongs to the classification category corresponding to the machine learning model; and
   taking, by the computer device, a weighted average of the second probability and the third probability as the first probability that the to-be-recognized image belongs to the classification category corresponding to the machine learning model.

7. The method according to claim 6, wherein the first submodel comprises a first classification submodel, and the second submodel comprises a second classification submodel;
   the computer device implements, through the first classification submodel, the operation of obtaining a first image feature corresponding to the to-be-recognized image, and obtaining, according to the first image feature, a second probability that the to-be-recognized image belongs to the classification category corresponding to the machine learning model; and
   the computer device implements, through the second classification submodel, the operation of obtaining a second image feature corresponding to the preprocessed image, and obtaining, according to the second image feature, a third probability that the preprocessed image belongs to the classification category corresponding to the machine learning model.

8. The method according to claim 7, wherein the machine learning model is determined by:
   obtaining, by the computer device, a second sample image belonging to the classification category corresponding to the machine learning model;
   performing, by the computer device, data enhancement processing on the second sample image, to obtain a third training image;
   preprocessing, by the computer device, the second sample image, and performing the data enhancement processing on the preprocessed second sample image, to obtain a fourth training image; and
   performing, by the computer device, model training according to the third training image, to obtain the first classification submodel, and performing model training according to the fourth training image, to obtain the second classification submodel.

9. The method according to claim 1, wherein the preprocessing the to-be-recognized image by the computer device comprises at least one or a combination of at least two of the following operations:
   adjusting, by the computer device, a target object in the to-be-recognized image to a reference object size;
   cropping, by the computer device, an invalid region in the to-be-recognized image, to obtain an image not comprising the invalid region;
   adjusting, by the computer device, the to-be-recognized image to a reference image size; and
   adjusting, by the computer device, an image attribute of the to-be-recognized image, the image attribute comprising at least one of a contrast and a grayscale.

10. The method according to claim 1, wherein the preprocessing the to-be-recognized image by the computer device comprises:
    adjusting, by the computer device, a target object in the to-be-recognized image to a reference object size, to obtain a first adjusted image;
    cropping, by the computer device, an invalid region in the first adjusted image, to obtain a second adjusted image, the second adjusted image not comprising the invalid region; and
    adjusting, by the computer device, the second adjusted image to a reference image size, to obtain a third adjusted image, the preprocessed image being obtained according to the third adjusted image.

11. The method according to claim 10, wherein the preprocessing the to-be-recognized image by the computer device further comprises:
adjusting, by the computer device, an image attribute of a target adjusted image, the target adjusted image comprising any one of the first adjusted image, the second adjusted image, and the third adjusted image, and the image attribute comprising at least one of a contrast and a grayscale.

12. The method according to claim 1, wherein the to-be-recognized image comprises a medical image; and the machine learning model comprises a convolutional neural network (CNN) model.

13. A computer device, comprising a memory and a processor, the memory storing a plurality of computer programs, and the computer programs, when executed by the processor, causing the computer device to perform a plurality of operations including:
obtaining, by the computer device, a to-be-recognized image;
preprocessing, by the computer device, the to-be-recognized image, to obtain a preprocessed image, to highlight details in the to-be-recognized image;
obtaining, by the computer device through a first submodel in a machine learning model, a first image feature corresponding to the to-be-recognized image, and obtaining, through a second submodel in the machine learning model, a second image feature corresponding to the preprocessed image; and
determining, by the computer device according to the first image feature and the second image feature, a first probability that the to-be-recognized image belongs to a classification category corresponding to the machine learning model, further including:
inputting, by the computer device, the first image feature and the second image feature into an output layer of the machine learning model; and
determining, by the computer device through the output layer of the machine learning model and according to the first image feature and the second image feature, the first probability that the to-be-recognized image belongs to the classification category corresponding to the machine learning model.

14. The computer device according to claim 7, wherein the first submodel comprises a first feature detection submodel, the second submodel comprises a second feature detection submodel, and the machine learning model further comprises: a first fully connected layer connected to the first feature detection submodel and a second fully connected layer connected to the second feature detection submodel, both the first fully connected layer and the second fully connected layer being connected to the output layer of the machine learning model;
the computer device implements, through the first feature detection submodel and the first fully connected layer, the operation of obtaining a first image feature corresponding to the to-be-recognized image; and
the computer device implements, through the second feature detection submodel and the second fully connected layer, the operation of obtaining a second image feature corresponding to the preprocessed image.

15. The computer device according to claim 13, wherein the determining, by the computer device according to the first image feature and the second image feature, a first probability that the to-be-recognized image belongs to a classification category corresponding to the machine learning model comprises:
obtaining, by the computer device through the machine learning model and according to the first image feature, a second probability that the to-be-recognized image belongs to the classification category corresponding to the machine learning model;
obtaining, by the computer device through the machine learning model and according to the second image feature, a third probability that the preprocessed image belongs to the classification category corresponding to the machine learning model; and
taking, by the computer device, a weighted average of the second probability and the third probability as the first probability that the to-be-recognized image belongs to the classification category corresponding to the machine learning model.

16. The computer device according to claim 13, wherein the preprocessing the to-be-recognized image by the computer device comprises at least one or a combination of at least two of the following operations:
adjusting, by the computer device, a target object in the to-be-recognized image to a reference object size;
cropping, by the computer device, an invalid region in the to-be-recognized image, to obtain an image not comprising the invalid region;
adjusting, by the computer device, the to-be-recognized image to a reference image size; and
adjusting, by the computer device, an image attribute of the to-be-recognized image, the image attribute comprising at least one of a contrast and a grayscale.

17. The computer device according to claim 13, wherein the preprocessing the to-be-recognized image by the computer device comprises:
adjusting, by the computer device, a target object in the to-be-recognized image to a reference object size, to obtain a first adjusted image;
cropping, by the computer device, an invalid region in the first adjusted image, to obtain a second adjusted image, the second adjusted image not comprising the invalid region; and
adjusting, by the computer device, the second adjusted image to a reference image size, to obtain a third adjusted image,
the preprocessed image being obtained according to the third adjusted image.

18. A non-transitory computer-readable storage medium, storing a plurality of computer programs, the computer programs, when executed by a processor of a computer device, causing the computer device to perform a plurality of operations including:
obtaining a to-be-recognized image;
preprocessing the to-be-recognized image, to obtain a preprocessed image, to highlight details in the to-be-recognized image;
obtaining, through a first submodel in a machine learning model, a first image feature corresponding to the to-be-recognized image, and obtaining, through a second submodel in the machine learning model, a second image feature corresponding to the preprocessed image; and
determining, according to the first image feature and the second image feature, a first probability that the to-be-recognized image belongs to a classification category corresponding to the machine learning model, further including:

inputting, by the computer device, the first image feature and the second image feature into an output layer of the machine learning model; and determining, by the computer device through the output layer of the machine learning model and according to the first image feature and the second image feature, the first probability that the to-be-recognized image belongs to the classification category corresponding to the machine learning model.

19. The non-transitory computer-readable storage medium according to claim 18, wherein the determining, according to the first image feature and the second image feature, a first probability that the to-be-recognized image belongs to a classification category corresponding to the machine learning model comprises:

obtaining, through the machine learning model and according to the first image feature, a second probability that the to-be-recognized image belongs to the classification category corresponding to the machine learning model;

obtaining, through the machine learning model and according to the second image feature, a third probability that the preprocessed image belongs to the classification category corresponding to the machine learning model; and taking a weighted average of the second probability and the third probability as the first probability that the to-be-recognized image belongs to the classification category corresponding to the machine learning model.

20. The non-transitory computer-readable storage medium according to claim 18, wherein the preprocessing the to-be-recognized image comprises:

adjusting a target object in the to-be-recognized image to a reference object size, to obtain a first adjusted image;

cropping an invalid region in the first adjusted image, to obtain a second adjusted image, the second adjusted image not comprising the invalid region; and adjusting the second adjusted image to a reference image size, to obtain a third adjusted image, the preprocessed image being obtained according to the third adjusted image.

* * * * *